United States Patent
Motohashi (10) Patent No.: US 7,670,693 B2
(45) Date of Patent: Mar. 2, 2010

(54) MAGNETIC RECORDING MEDIUM POSSESSING A COLUMNAR STRUCTURE

(75) Inventor: Kazunari Motohashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/215,546

(22) Filed: Jun. 27, 2008

(65) Prior Publication Data

US 2008/0274380 A1    Nov. 6, 2008

Related U.S. Application Data

(63) Continuation of application No. 10/613,371, filed on Jul. 3, 2003, now abandoned.

(30) Foreign Application Priority Data

Jul. 8, 2002    (JP) .............................. 2002-198739

(51) Int. Cl.
G11B 5/66    (2006.01)
(52) U.S. Cl. ...................... 428/826; 428/836; 428/842; 428/212
(58) Field of Classification Search ................. None
See application file for complete search history.

(56) References Cited

U.S. PATENT DOCUMENTS

| | | | |
|---|---|---|---|
| 5,225,234 A * | 7/1993 | Takai et al. ................. | 428/336 |
| 5,453,886 A * | 9/1995 | Kobayashi et al. ............ | 360/46 |
| 5,472,506 A * | 12/1995 | Tohma et al. ................ | 118/718 |
| 5,525,398 A * | 6/1996 | Takai et al. ................. | 428/141 |
| 5,554,440 A | 9/1996 | Ishida et al. | |
| 7,026,064 B1 | 4/2006 | Tsunekawa et al. | |
| 7,198,861 B2 * | 4/2007 | Yoshida et al. ........... | 428/832.1 |

* cited by examiner

Primary Examiner—Kevin M Bernatz
(74) Attorney, Agent, or Firm—Robert J. Depke; Rockey, Depke & Lyons, LLC (57) ABSTRACT

The present invention provides a magnetic recording medium that excels in electromagnetic conversion characteristics. The magnetic recording medium has a 55 nm or less thickness magnetic layer formed on a major surface of an elongated nonmagnetic support by performing a vacuum thin film forming technique, the magnetic recording medium being slid over a magnetoresistive effect magnetic head or a giant magnetoresistive effect head to reproduce a signal, wherein an angle $\theta$ which is formed by a growth direction of magnetic particles in a columnar structure in a longitudinal cross-section of the magnetic layer and a normal to a longitudinal direction of the nonmagnetic support, satisfies the following relation:

$$\theta_i - \theta_f \leq 25°.$$

where $\theta_i$ is an angle of $\theta$ in an initial growth portion of the magnetic layer, and $\theta_f$ is an angle of $\theta$ in a final growth portion of the magnetic layer.

2 Claims, 6 Drawing Sheets

MAGNETIC RECORDING MEDIUM POSSESSING A COLUMNAR STRUCTURE

The subject matter of application Ser. No. 10/613,371, is incorporated herein by reference. The presented application is a continuation of U.S. Ser. No. 10/613,371, filed Jul. 3, 2003 now abandoned, which claims priority to Japanese Patent Application No. JP2002-198739 filed Jul. 8, 2002. The present application claims priority to these previously filed applications.

CROSS REFERENCE TO RELATED APPLICATIONS

The present document is based on Japanese Priority Document JP2002-198739, filed in the Japanese Patent Office on Jul. 8, 2002, the entire contents of which being incorporated herein by reference.

BACKGROUND OF THE INVENTION

1. Field of the Invention

The present invention relates to a high-density magnetic recording medium and, more particularly, to a magnetic recording medium, from which signals are reproduced, for use in a system using a magnetoresistive effect magnetic head (MR head) or a giant magnetoresistive effect magnetic head (GMR head).

2. Description of the Related Art

In recent years, what is called a metallic thin film magnetic recording medium, in which a magnetic layer is formed by coating a nonmagnetic support directly with various kinds of magnetic materials, such as magnetic metallic materials, Co—Ni alloys, Co—Cr alloys, and, metal oxide Co—CoO, through vacuum thin film forming techniques is utilized as a magnetic recording medium in the field of video tape recorders in order to achieve higher picture quality and higher recording density.

To improve the electromagnetic conversion characteristics of the magnetic recording medium so as to obtain a larger output, what is called an oblique evaporation method has been proposed, according to which the formation of a magnetic layer of the magnetic recording medium is performed by obliquely evaporating the magnetic layer. The magnetic recording medium, whose magnetic layer is formed by this method, is practically used as evaporated tape for use in high-band 8 mm video tape recorders and digital video tape recorders.

The metallic thin film magnetic recording media excel in coercive force and in squareness ratio. Because the magnetic layers thereof can be formed in such a way as to be extremely thin, the metallic thin film magnetic recording media excel in electromagnetic conversion characteristics in a short-wavelength region. Demagnetization during recording and thickness loss during reproduction are extremely small. In the metallic thin film magnetic recording media, binders, which are nonmagnetic materials, are not mixed into the magnetic layers thereof. It differs from what is called a coated magnetic recording medium in which a magnetic layer is formed by applying a magnetic coating, which is obtained by dispersing magnetic powder in the binder, on a nonmagnetic support. Thus the packing density of ferromagnetic metallic materials is increased, so that the metallic thin film magnetic recording media have an advantage in achieving high recording density.

Oblique-evaporated magnetic tape is manufactured by performing, for example, a method of making an elongated nonmagnetic support run in the longitudinal direction thereof and depositing a magnetic material on a major surface of the nonmagnetic support while the tape runs, thereby forming a magnetic layer. Thus, high productivity and excellent magnetic property can be assured.

On the other hand, as demands for magnetic recording media, such as magnetic tape, serving as data streamers rise, the magnetic recording medium has been requested to have higher recording density. Instead of a conventional inductive head used for reproducing recorded information, a magnetoresistive effect magnetic head (MR head) is applied as a magnetic head used when recorded information is reproduced. This MR head can detect micro leakage magnetic flux with high sensitivity. Thus, the MR head is effective in increasing this recording density.

Meanwhile, the MR head has a detection limit at which the sensitivity thereof against a leakage magnetic flux saturates. The MR head cannot detect a leakage magnetic flux when the leakage magnetic flux is more than a design limit of the MR head. It is, therefore, necessary to optimize the MR head by reducing the film thickness of the magnetic layer of the magnetic recording medium.

To achieve a denser magnetic recording medium, it is important to reduce medium noises by decreasing the size of magnetic fine particles constituting the magnetic layer of the magnetic recording medium and to attain the improvement of orientation of the magnetic fine particles so as to achieve high outputs thereof.

When a magnetic layer is formed in the case of magnetic tape in which a magnetic tape is formed by the oblique evaporation, the magnetic layer is formed by causing the elongated nonmagnetic support to run in the longitudinal direction thereof and depositing magnetic fine particles on a major surface of the nonmagnetic support. At that time, an angle, at which the magnetic particle incidents upon the nonmagnetic support, is optimized. The reduction in the size of the magnetic fine particles is performed by introducing a reactive gas, such as oxygen or nitrogen, into a magnetic layer forming atmosphere. Consequently, the diameter of the magnetic fine particles constituting the magnetic layer ranges from 5 nm to 20 nm or so.

SUMMARY OF THE INVENTION

However, in the case of the magnetic tape produced by using the oblique evaporation method of causing the elongated nonmagnetic support to run in the longitudinal direction thereof and depositing magnetic fine particles on a major surface of the nonmagnetic support, when the film thickness of the magnetic layer is reduced from 200 nm or so of the magnetic layer of the conventional medium to 55 nm or less, the number of magnetic fine particles contained in the direction of film thickness of the magnetic layer becomes small, that is, 2 to 11 particles or so. Thus, this magnetic tape has drawbacks in that the discrete dispersion of orientation of the magnetic fine particles seriously affects the magnetic properties of the entire magnetic layer, and that a superior orientation thereof cannot be obtained.

Such drawbacks result from the fact that the magnetic fine particles cannot be deposited on the nonmagnetic support by maintaining a certain angle with respect thereto. This is because the film deposition is performed by simultaneously causing the nonmagnetic support to proceed along a cylindrical cooling can in the case of using the method of causing the elongated nonmagnetic support to run in the longitudinal direction thereof and depositing magnetic fine particles on a major surface of the nonmagnetic support.

For example, in the case of magnetic tape to be used as digital video tape, magnetic fine particles start growing at an angle close to parallel with respect to the longitudinal direction of the nonmagnetic support at an initial growth portion of the magnetic layer. Growth direction of the particles gradually and upwardly changes with respect to the longitudinal direction of the nonmagnetic support, so that a growth angle increases. The entire magnetic layer has a columnar structure in which the growth direction of the magnetic fine particles is curved.

Figure 1A:
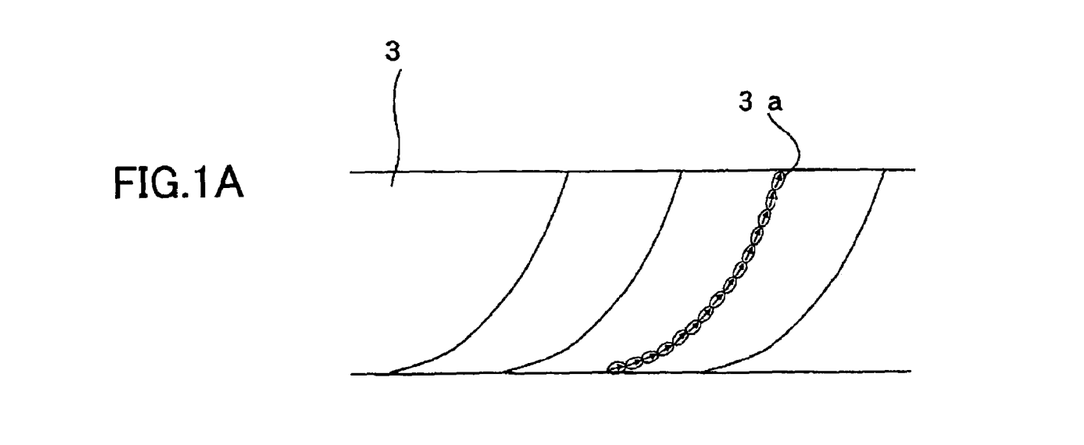
FIG. 1A is a schematic view illustrating a columnar structure of magnetic fine particulars in a longitudinal section of a magnetic layer.
Figure 1B:
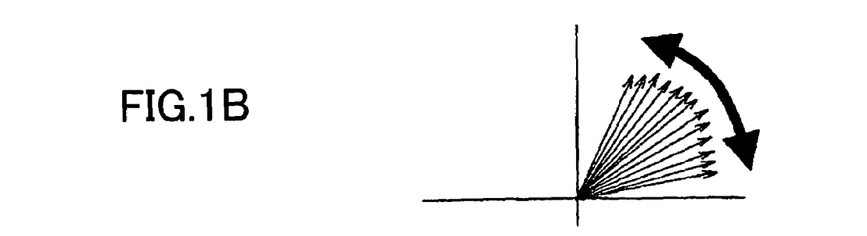
FIG. 1B is a view schematically illustrating change in the growth direction of the magnetic fine particles in the direction of thickness of the magnetic layer.
Figure 2A:
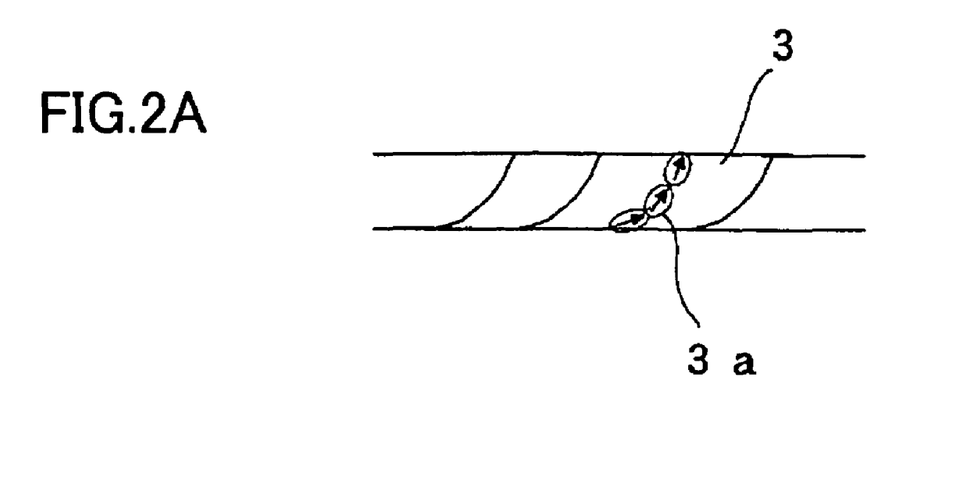
FIG. 2A is a schematic view illustrating a columnar structure of magnetic fine particulars in the longitudinal section of a magnetic layer.
Figure 2B:
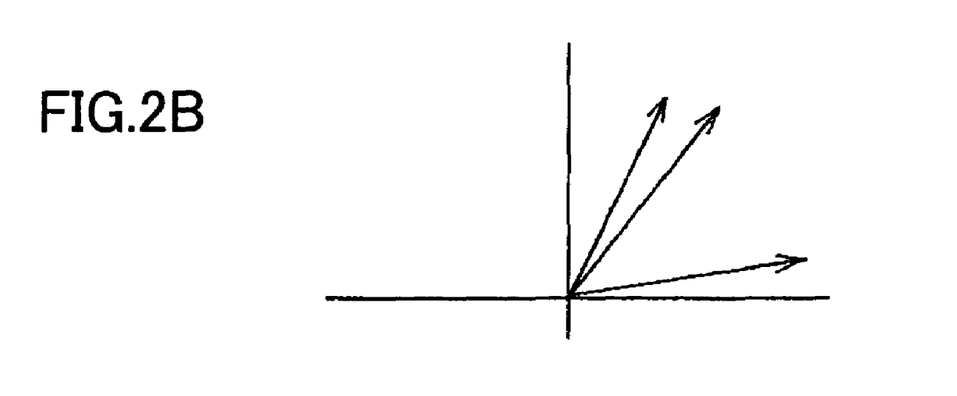
FIG. 2B is a view schematically illustrating change in the growth direction of magnetic fine particles in the direction of thickness of the magnetic layer.

FIGS. 1A and 2A are schematic views each illustrating the deposited state of the magnetic fine particles 3a in the magnetic layer 3 of the magnetic tape to be used as digital video tape, and also illustrating the growth direction thereof indicated by arrows. FIGS. 1B and 2B are graphs respectively illustrating the growth directions of the magnetic fine particles, which correspond to FIGS. 1A and 2A and are indicated by arrows, which emanate from a reference point of the coordinate system, for facilitating the understanding of the change in the growth direction.

Incidentally, FIGS. 1A and 1B are schematic views illustrating the magnetic tape in which the film thickness of the magnetic layer 3 is set to be 200 nm or so. FIGS. 2A and 2B are schematic views illustrating the magnetic tape in which the film thickness of the magnetic layer 3 is set to be about 55 nm or less.

As shown in FIG. 1A, in the case that the film thickness of the magnetic layer 3 is 200 nm or so, the magnetic fine particles 3a contained therein are relatively and sufficiently small. Thus, as shown in FIG. 1B, the entire arranging direction of the magnetic fine particles 3a contained in the curved-column structure can be regarded as being continuous.

However, in the case that the film thickness of the magnetic layer 3 is about 55 nm or less, as shown in FIG. 2A, the orientation of the magnetic fine particles 3a cannot follow the curved-column structure. Thus, as shown in FIG. 2B, the orientation thereof becomes discrete. Consequently, this magnetic recording medium has a drawback in that the orientation of the magnetic layer 3 is degraded.

The above-mentioned drawbacks become more serious owing to the necessity for reducing the film thickness of the magnetic layer in the case of employing a giant magnetoresistive effect magnetic head (that is, GMR head), which is higher in the reproduction sensitivity and suitable for use in a high frequency region and in high-density recording, as a reproducing magnetic head for the magnetic recording media, instead of the MR head.

Thus, in view of the drawbacks of the related art, the improvement of the orientation of the magnetic fine particles in the magnetic layer of the magnetic recording medium is studied. Accordingly, the invention is created to provide a high-recording-density-capable magnetic recording medium.

According to the present invention, there is provided a magnetic recording medium that excels in electromagnetic conversion characteristics. The magnetic recording medium has a 55 nm or less thickness magnetic layer formed on a major surface of an elongated nonmagnetic support by performing a vacuum thin film forming technique, the magnetic recording medium being slid over a magnetoresistive effect magnetic head or a giant magnetoresistive effect head to reproduce a signal, wherein an angle θ which is formed by a growth direction of magnetic particles in a columnar structure in a longitudinal cross-section of the magnetic layer and a normal to a longitudinal direction of the nonmagnetic support, satisfies the following relation:

$$\theta i - \theta f \leq 25°.$$

where θi is an angle of θ in an initial growth portion of the magnetic layer, and θf is an angle of θ in a final growth portion of the magnetic layer.

According to the present invention, the orientation of the magnetic fine particles constituting the magnetic layer of the magnetic recording medium is improved by focusing attention to an angle in the growth direction of the magnetic fine particles. Thus, the improvement of the electromagnetic conversion characteristics is achieved. Consequently, the present invention provides high-recording-density magnetic recording media applicable to various magnetic recording tape systems, for instance, tape streamers.

In the case of the magnetic recording media according to the present invention, the orientation of the magnetic fine particles constituting the magnetic layer is improved. Thus, the electromagnetic conversion properties are enhanced. Consequently, the magnetic recording media according to the present invention are extremely advantageous in effectively utilizing high reproduction sensitivity of the MR head or the GMR head.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiment of the present invention will be described in detail by referring to the accompanying drawings. However, the present invention is not limited thereto.

Figure 3:
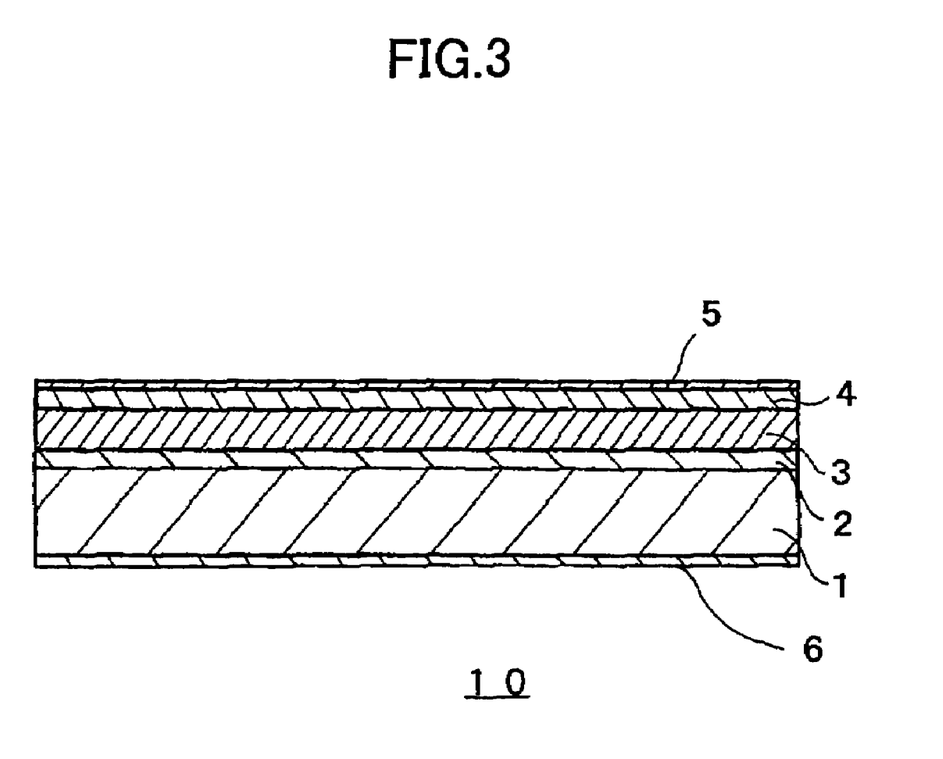
FIG. 3 is a schematic view illustrating the constitution of a magnetic recording medium.

FIG. 3 is a schematically sectional view illustrating a magnetic recording medium 10 that is an embodiment of the present invention. The magnetic recording medium 10 has a structure in which an underlying layer 2, a magnetic layer 3, and a protective layer 4 are sequentially formed on an elongated nonmagnetic support 1 in this order. Incidentally, a lubricant layer 5 may be formed on the protective layer 4 from a predetermined lubricant. On the opposite side to a side on which the magnetic layer 3 is formed, a backcoating layer may be formed.

Known materials used in the related art magnetic tape may be employed as the material of the nonmagnetic support 1. For example, polyester group including polyethylene terephthalate (PET) and polyethylene naphthalate (PEN); polyolefins group, such as polyethylene and polypropylene; cellulose derivatives, such as cellulose acetate; and plastics, such as polycarbonate, polyimide, polyamide and polyamideimide are cited.

To enhance the durability and running performance of the finally obtained magnetic recording medium 10, and the handlability during deposition, the underlying layer 2 may be formed from a coating material containing binder resins, fillers, and surface active agents. Then, minute irregularities may be added to the surface of the underlying layer 2. The mechanical strength thereof may be enhanced.

Binder resins constituting this underlying layer 2 are, for instance, water-soluble polyester resins, water-based acryl resins, and water-soluble polyurethane. The fillers are particles made of heat-resisting polymers or particles made of silicon dioxide or calcium carbonate. It is preferable that the average of the particle diameter of the filler constituting the lying layer 2 ranges 5 nm to 30 nm, and that the density of surface projections formed from the filler is $50 \times 10^4$ per mm$^2$ to $3000 \times 10^4$ per mm$^2$ or so. This enables the finally obtained magnetic recording medium 10 to realize more favorable running durability and electromagnetic conversion characteristics.

Minute projections may be formed on the nonmagnetic support 1 by using a method of artificially forming irregularities thereon through a lithography technique, or using a method of forming an island-like structure of metal, inorganic compound or organic polymer through a plating technique or vacuum thin film forming technique, in addition to the above-described methods.

The magnetic layer 3 is formed by performing a vacuum evaporation method according to which ferromagnetic metallic materials are heat-evaporated, and then made to adhere to the underlying layer 2 under vacuum. The oblique evaporation manufacturing method has the steps of making the elongated nonmagnetic support 1 run in the longitudinal direction thereof and depositing a magnetic material on a major surface of the nonmagnetic support while the tape runs thereby to form a magnetic layer. This oblique evaporation manufacturing method has advantages in favorable film-formability, high productivity, and easy-operability.

Figure 4:
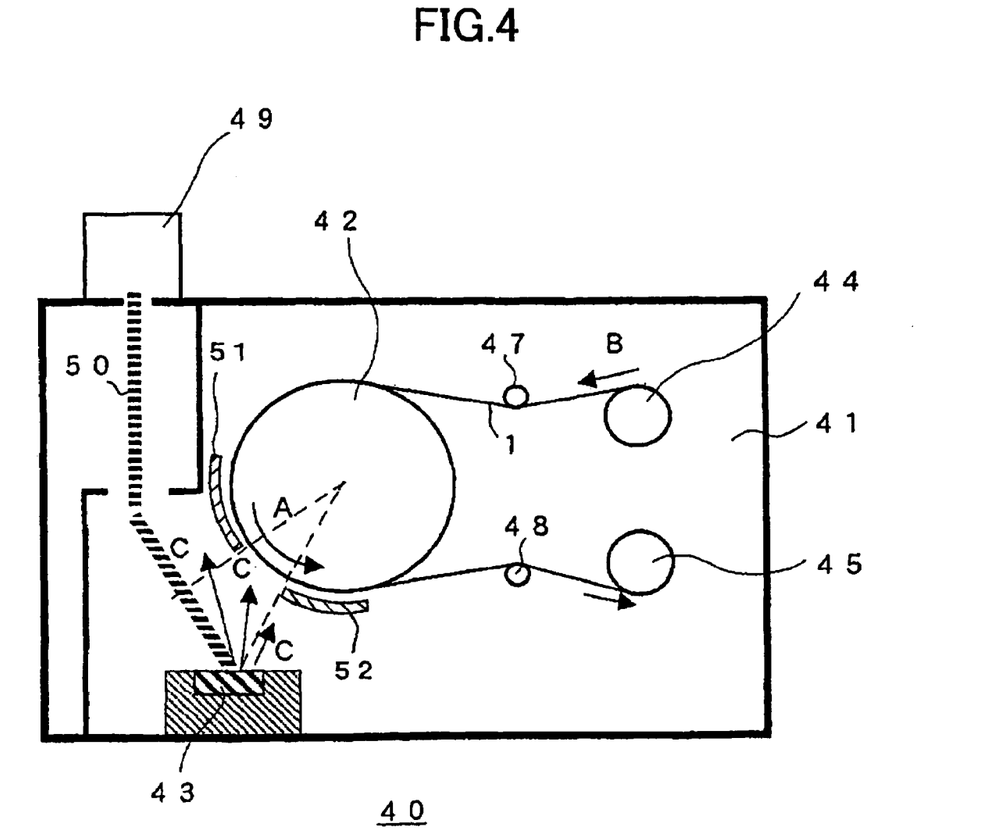
FIG. 4 is a schematic view illustrating the configuration of a vacuum evaporator for forming a magnetic layer.

A continuously winding type vacuum evaporator 40 illustrated in FIG. 4 can be applied as a vacuum evaporator for forming the magnetic layer 3. This vacuum evaporator 40 is configured specifically for what is called the oblique evaporation. In the vacuum chamber 41 evacuated to about $1 \times 10^{-3}$ Pa, a cooling can 42, which is adapted to be cooled to a temperature of, for example, $-20°$ C. or so and to be rotated in a direction indicated by arrow A in this figure, and an evaporation source 43 for ferromagnetic metallic thin film are disposed in such a way as to face each other.

In this vacuum evaporator 40, a supply roll 44 and a take-up roll 45 are disposed in the vacuum chamber 41, as shown in this figure. After the underlying layer 2 is formed thereon, the nonmagnetic support 1 is fed from the supply roll 44 in the direction indicated by arrow B in this figure. Then, the nonmagnetic support 1 runs along the circumferential surface of the cooling can 42. Thereafter, the nonmagnetic support 1 is taken up by the take-up roll 45.

Incidentally, guide rollers 47 and 48 are placed between the supply roll 44 and the cooling can 42 and between the cooling can 42 and the take-up roll 48, respectively. The roller 47 applies a predetermined tension onto the nonmagnetic support 1 running in a range between the supply roller 44 and the cooling can 42. Then, the roller 48 applies the predetermined tension onto the support 1 running in a range between the supply roller 44 and the cooling can 42. Thus, the nonmagnetic support 1 is enabled to smoothly run in these regions.

The evaporation source 43 is a crucible containing a ferromagnetic metallic material, such as Co. In this vacuum evaporator 40, an electron beam source 49 for heating and evaporating the ferromagnetic metallic material of the evaporation source 43 is disposed. That is, an electron beam 50 is irradiated from the electron beam source 49 onto the ferromagnetic metallic material of the evaporation source 43 by being accelerated. As indicated by arrow C in this figure, this ferromagnetic metallic material is heated and evaporated. Then, the ferromagnetic metallic material adheres onto the nonmagnetic support 1 that runs along the circumferential surface of the cooling can 42 facing the evaporation source 43. Thus, the ferromagnetic metallic thin film is formed.

Incidentally, in the vacuum evaporator 40, a first shutter 51 and a second shutter 52 are provided between the evaporation source 43 and the cooling can 42. The nonmagnetic support 1 runs through the first shutter 51 at the earlier stage and then through the second shutter 52 at the later stage. The first shutter 51 and the second shutter 52 outwardly expose only a predetermined region of the nonmagnetic support 1.

Preferably, at such evaporation of the ferromagnetic metallic thin film, oxygen gas is supplied to the neighborhood of the surface of the nonmagnetic support 1 through an oxygen gas inlet (not shown) to thereby enhance the magnetic properties, the durability, and the weatherability of the ferromagnetic metallic thin film. To heat the evaporation source, known means, such as resistance heating means, high-frequency heating means, and laser heating means, may be used, in addition to the heating means using electron beams.

In the vacuum evaporator 40 of this configuration, the ferromagnetic metallic material is vaporized from the evaporation source 43. Moreover, the nonmagnetic support 1 is made to run along the circumferential surface of the cooling can 42. The vaporized ferromagnetic metallic material is deposited only on the portion outwardly exposed from between the first shutter 51 and the second shutter 52. Incidentally, the first shutter 51 is disposed at the earlier running stage of the nonmagnetic support 1 and determines a maximum incidence angle $\alpha i$ of the evaporated metallic magnetic material. On the other hand, the second shutter 52 is disposed at the later running stage of the nonmagnetic support 1 and determines a minimum incidence angle $\alpha f$ of the evaporated metallic magnetic material. The "incidence angle" is defined herein as an angle formed by a direction, in which the vaporized ferromagnetic metallic material incidents upon the nonmagnetic support 1, and a normal direction to the nonmagnetic support at a place upon which the vaporized ferromagnetic metallic material incidents.

In this vacuum evaporator 40, the nonmagnetic support 1 runs from the first shutter 51 toward the second shutter 52, so that the evaporated ferromagnetic metallic material is first deposited on a part of the nonmagnetic support 1, which is at the side of the first shutter 51. Then, as the nonmagnetic support 1 runs from the first shutter 51 toward the second shutter 52, the remaining parts of the vaporized ferromagnetic metallic material are sequentially deposited thereon. Therefore, the ferromagnetic metallic material is first deposited on the nonmagnetic support 1 at the maximum incidence angle. Finally, the deposition of the ferromagnetic metallic material is finished at the minimum incidence angle.

It is known that the magnetic fine particles grow in a direction determined according to what is called a "tangent rule" relating to the incidence angle in a columnar structure in a longitudinal section of the magnetic layer 3 formed by limiting the incidence angle of the magnetic fine particles through the above-mentioned evaporation method. It is also known that although an actual angle, at which the growth of the column occurs, differs from the incidence angle of the magnetic fine particles, the range of the angle at which the growth of the column is not larger than the difference between the maximum incidence angle $\alpha i$ and the minimum incidence angle $\alpha f$.

Figure 5:
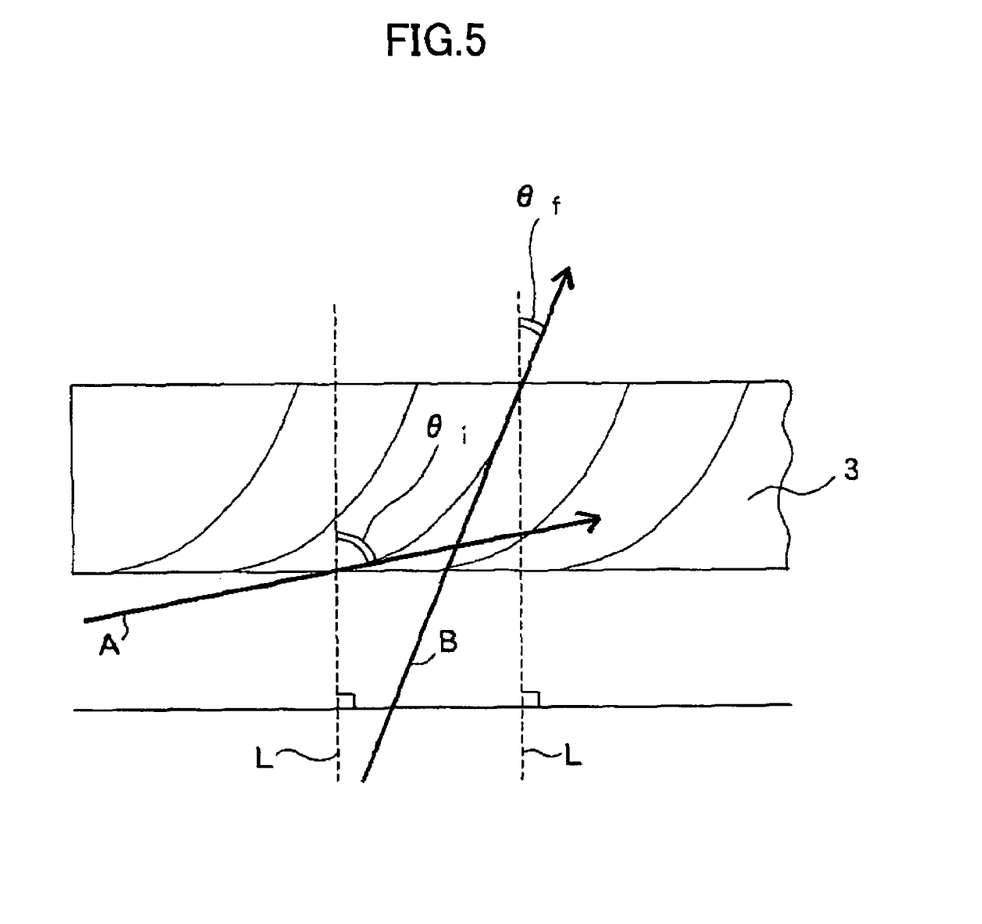
FIG. 5 is a schematic view illustrating an angle θi at an initial growth portion of a magnetic layer, and an angle θf at a final growth portion of the magnetic layer.

Therefore, in the schematic view of the columnar structure in the longitudinal section of the magnetic layer shown in FIG. 5, in order to achieve the deposition so that the following relation holds:

$$\theta i - \theta f \leq 25°$$

where an angle which the arrow A forms with the normal L, that is, the angle $\theta i$ at an initial growth portion of the magnetic layer and an angle which the arrow B forms with the normal L, that is, the angle $\theta f$ at a final growth portion thereof, a deposition range should be restricted so that at least, the maximum incidence angle $\alpha i$ and the minimum incidence angle $\alpha f$ meet the following relation:

$$\alpha i - \alpha f \leq 25°.$$

The magnetic recording media according to the present invention is applied to recording/reproducing apparatus having MR head or GMR head. It is preferable for reducing noises and enhancing C/N that the magnetic layer 3 should be formed in such a way as to be extremely thin. Preferably, the thickness of the magnetic layer ranges from 5 nm to 55 nm. In the case that the magnetic layer has a thickness that is less than 5 nm, a sufficient reproduction output sometimes cannot be obtained even when, for example, high-sensitivity GMR head is used. Conversely, in the case that the magnetic layer 3 is formed in such a way as to be thicker than 55 nm, a desired recording density sometimes cannot be achieved when MR head or GMR head is employed.

Known metallic materials and magnetic alloys usually used for manufacturing this kind of a magnetic recording medium may be applied as the ferromagnetic metallic material constituting the magnetic layer 3. Various kinds of materials, for example, ferromagnetic metals such as Co and Ni, Co—Ni alloy, Co—Fe alloy, Co—Ni—Fe alloy, Co—Cr alloy, Co—Pt alloy, Co—Pt—B alloy, Co—Cr—Ta alloy, and Co—Cr—Pt—Ta alloy, or materials such as those obtained by performing the deposition thereof in oxygen environment so that oxygen is contained in resultant film, or materials made to contain one or more other kinds of elements into the above mentioned materials may be applied as the ferromagnetic metallic material constituting the magnetic layer 3.

In the magnetic recording medium 10 according to the present invention, an intermediate layer (not shown) may be formed between the magnetic layer 3 and the nonmagnetic support 1, in addition to the underlying layer 2, by using the vacuum thin film forming technique so as to miniature crystal particles constituting the magnetic layer 3 and to improve the orientation thereof.

The vacuum thin film forming techniques are, for instance, a vacuum evaporation method of heating and evaporating a predetermined material under vacuum conditions and causing the evaporated material to adhere to a target to be processed, an ion-plating method of evaporating a predetermined material during electric discharge, and what are called physical vapor deposition (PVD) methods, such as a sputtering method of causing glow discharge in atmosphere, whose primary ingredient is argon, and impacting and ejecting atoms of a surface of a target with generated argon ions. The materials constituting the intermediate layer are metallic materials, such as Co, Cu, Ni, Fe, Zr, Pt, Au, Ta, W, Ag, Al, Mn, Cr, Ti, V, Nb, Mo, and Ru, alloys each obtained by combination of given two or more kinds of such materials, or compounds of these metallic materials, and oxygen or nitrogen, compounds of silicon dioxide, silicon nitride, ITO (Indium Tin Oxide), $In_2O_3$, and Zr, carbon, and diamond-like carbon.

Preferably, the protective layer 4 made of diamond-like carbon is formed on the magnetic layer 3 so as to ensure favorable running durability and corrosion resistance. The protective layer 4 may be formed by CVD (Chemical Vapor Deposition) method using, for example, a plasma CVD continuous-film-formation apparatus. Known CVD methods, such as a mesh-electrode DC plasma method, an electron-beam-excited plasma source method, a cold cathode ion source method, an ionized evaporation method, and a catalytic CVD method, may be used. Known materials, such as hydrocarbon compounds, ketonic compounds, and alcohol compounds, may be used as carbon compounds used for the CVD method. At plasma generation, Ar gas or $H_2$ gas may be introduced thereinto as a gas for accelerating the decomposition of carbon compounds.

On the protective layer 4, a lubricant layer 5 may be formed by applying, for instance, an arbitrary perfluoropolyether lubricant thereto so as to improve the running performance. On the side opposite to the surface on which the magnetic layer 3 is formed, a backcoating layer 6 is formed with the intention of improving the running performance and preventing electrostatics. Preferably, the film thickness of the backcoating layer 6 is about 0.2 to 0.7 μm. The backcoating layer 6 is formed by dispersing solid particles of inorganic pigments into the binder and then performing kneading thereof together with an organic solvent selected according to the kind of the binder to thereby prepare a coating material for a backcoating layer, and subsequently applying this coating material on the back surface of the nonmagnetic support 1. It is desirable that a predetermined lubricant is applied onto the surface of the backcoating 6.

The magnetic recording medium of the present invention manufactured in the above-described manner is suitable for use in a helical-scan magnetic recording system using MR head. Here, MR head is a reproduction-only magnetic head adapted to detect signals sent from a magnetic recording medium by utilizing the magnetoresistive effect.

Generally, the MR heads are higher in sensitivity and larger in reproduction output than inductive magnetic heads, which perform recording/reproducing by utilizing electromagnetic induction. Therefore, the MR heads are suitable for use with a high-recording-density magnetic recording medium. The MR head has a substantially rectangular MR-device portion held between a pair of magnetic shields, which are made of a soft magnetic material, such as Ni—Zn polycrystalline ferrite through an insulator. Paired terminals are drawn out of both ends of the MR device portion. Sense current is supplied through these terminals to the MR-device portion.

When signals sent from the magnetic recording medium are reproduced by using the MR head, the MR-device portion is slid on the magnetic recording medium. During this state, a sense current is supplied to the MR-device portion through the terminals connected to both ends of the MR-device portion that detects change in the voltage level of this sense current. When a sense current is supplied to the MR-device portion during the MR-device portion is slid on the magnetic recording medium, the magnetization direction of the MR-device portion changes according to a magnetic field generated from the magnetic recording medium. The relative angle between the magnetization direction of the MR-device portion and the direction of the sense current supplied to the MR-device changes. Then, a resistance value changes depending upon the relative angle between the magnetization direction of the MR-device portion and the direction of the sense current. Thus, a change in the voltage level of the sense current is caused by maintaining the value of the sense current, which is supplied to the MR-device portion, at a constant value. Then, a magnetic field generated by the signal sent from the magnetic recording medium is detected by detecting the change in the voltage level of the sense current. Consequently, the signal recorded on the magnetic recording medium is reproduced.

Incidentally, what is called a giant magnetoresistive effect magnetic head may be applied as a reproducing magnetic head. Various techniques for applying a bias magnetic field to the MR-device, for instance, a permanent-magnet biasing method, a shunt current biasing method, a self-biasing method, an exchange biasing method, a barber pole method, a divided device method or a servo-biasing method, are applicable, in addition to SAL biasing method. Incidentally, the giant magnetoresistive effect device and various kinds of bias methods are described in detail in, for instance, "MAGNETORESISTIVE HEADS—Fundamentals and Applications" translated by Kazuhiko Hayashi and published by Maruzen Co. LTD.

Hereinafter, practical examples of the magnetic recording medium of the present invention are described according to results of experiments.

EXAMPLE 1

A polyethylene terephthalate (PET) film, which is 6.3 μm in film thickness and 150 mm in width, was prepared as a nonmagnetic support 1. On a magnetic-layer-formation-side surface of this nonmagnetic support 1, a 5 nm thick underlying layer 2 was formed. The underlying layer 2 was formed by applying a coating, which was obtained by dispersing 10 nm diameter silica particles in a water-soluble latex whose main ingredient was an acrylic ester, onto the nonmagnetic support 1 so that the density was $1 \times 10^7$ per $mm^2$. Subsequently, an intermediate layer made of diamond-like carbons was formed on the underlying layer 2 by the plasma CVD method so that the film thickness of the underlying layer 2 was 3 nm.

Subsequently, a magnetic layer 3 was formed by using the vacuum evaporator 40 illustrated in FIG. 4. The material of the magnetic layer 3 was Co. From an oxygen gas introducing pipe, $6 \times 10^{-4}$ $m^3$/min of oxygen was introduced thereinto. Electron beams 50 were irradiated from the electron beam source 49 onto the material thereby to heat the material. The Co—CoO based magnetic layer was formed by reactive vacuum evaporation in such a way as to be 50 nm in film thickness. At that time, the incident angles of the Co evaporation particles were adjusted as the minimum incidence angle of 45° and as the maximum incidence angle of 70° by the first shutter 51 and the second shutter 52.

Then, a protective layer 4 constituted by a diamond-like carbon was formed on the magnetic layer 3 by the plasma CVD method in such a manner as to have a film thickness of 10 nm. Lubricant layer 5 having a film thickness of 2 nm was formed on the protective layer 4 by applying a perfluoropolyether lubricant thereon. Then, a coating material including carbon particles, whose average diameter was 20 nm, and an urethane resin was applied on a major surface opposite to the surface on which the magnetic layer was form, by using a direct gravure method, so that a 0.5 μm thick backcoating layer was formed. Thus, a raw sheet of an objective magnetic recording medium 10 was obtained. Subsequently, the raw sheet was cut into 8-mm width pieces, so that a sample magnetic tape piece was obtained.

Next, sample magnetic tape pieces of Example 2, Example 3, and Comparative Example 1 to Comparative Example 5 were obtained by changing predetermined ones of the conditions as below for manufacturing the magnetic recording medium.

EXAMPLE 2

Magnetic tape was manufactured by setting the film thickness of the magnetic layer 3 to be 30 nm, and adjusting the minimum incidence angle and the maximum incidence angle of evaporated Co particles to 40° and 60°, respectively, and maintaining the other conditions that were the same as the corresponding conditions in the case of Example 1.

EXAMPLE 3

Magnetic tape was manufactured by setting the film thickness of the magnetic layer 3 to be 40 nm, and adjusting the minimum incidence angle and the maximum incidence angle of evaporated Co particles to 65° and 90°, respectively, and maintaining the other conditions that were the same as the corresponding conditions in the case of Example 1.

COMPARATIVE EXAMPLE 1

Magnetic tape was manufactured by setting the film thickness of the magnetic layer 3 to be 50 nm, and adjusting the minimum incidence angle and the maximum incidence angle of evaporated Co particles to 40° and 70°, respectively, and maintaining the other conditions that were the same as the corresponding conditions in the case of Example 1.

COMPARATIVE EXAMPLE 2

Magnetic tape was manufactured by setting the film thickness of the magnetic layer 3 to be 50 nm, and adjusting the minimum incidence angle and the maximum incidence angle of evaporated Co particles to 45° and 75°, respectively, and maintaining the other conditions that were the same as the corresponding conditions in the case of Example 1.

COMPARATIVE EXAMPLE 3

Magnetic tape was manufactured by setting the film thickness of the magnetic layer 3 to be 30 nm, and adjusting the minimum incidence angle and the maximum incidence angle of evaporated Co particles to 40° and 70°, respectively, and maintaining the other conditions that were the same as the corresponding conditions in the case of Example 2.

COMPARATIVE EXAMPLE 4

Magnetic tape was manufactured by setting the film thickness of the magnetic layer 3 to be 40 nm, and adjusting the minimum incidence angle and the maximum incidence angle of evaporated Co particles to 45° and 90°, respectively, and maintaining the other conditions that were the same as the corresponding conditions in the case of Example 3.

COMPARATIVE EXAMPLE 5

Magnetic tape was manufactured by setting the film thickness of the magnetic layer 3 to be 57 nm, and adjusting the minimum incidence angle and the maximum incidence angle of evaporated Co particles to 45° and 70°, respectively, and maintaining the other conditions that were the same as the corresponding conditions in the case of Example 1.

Observation of a columnar structure in a longitudinal section of each of the sample magnetic tape pieces, which were manufactured as above-mentioned, and the evaluation of electromagnetic conversion characteristics were performed by using the methods described hereinbelow.

Practically, the columnar structure in the longitudinal section of the magnetic layer was observed by using a transmission electron microscope. Observational sample pieces were manufactured by an ultrathin section method using an ultramicrotome, that is, slicing the magnetic layer in the longitudinal direction thereof so that the specimen thickness of each of the observational sample pieces was 30 nm.

Evaluation of an electromagnetic conversion characteristic of each of the sample pieces manufactured in the above-mentioned way was performed. MIG (Metal-In-Gap) head, which was 0.22 μm in gap length and 20 μm in track width, was used as a recording head. Measurement of the electromagnetic conversion characteristic (that is, in this case, a ratio of a carrier output to a media noise (CNR)) was performed by recording a signal at a recording wavelength of 0.3 μm with the MIG head and by thereafter reproducing the signal with Ni—Fe MR head whose track width was 5 μm. Then, the evaluation of the CNR was performed. Incidentally, the relative speed between the sample magnetic tape and the MR head was set to be 7 m/sec.

Data representing the film thickness of the magnetic layer of each sample magnetic tape, the incidence angles (that is, the maximum incidence angle $\alpha i$ and the minimum incidence angle $\alpha f$) of the magnetic particles at the formation of the magnetic layer, the columnar structure in the longitudinal section of the magnetic layer (that is, an angle $\theta i$ at an initial growth portion and an angle $\theta f$ at a final growth portion thereof) are listed below in TABLE 1. The values of the difference ($\theta i - \theta f$) and results of the evaluation of the electromagnetic conversion characteristic (CNR in this case) are listed below in TABLE 2.

TABLE 1

| | FILM THICKNESS OF MAGNETIC LAYER | INCIDENCE ANGLE OF OF MAGNETIC PARTICLES TO NONMAGNETIC SUPPORT | | COLUMNAR STRUCTURE IN LONGITUDINAL SECTION OF MAGNETIC LAYER | |
|---|---|---|---|---|---|
| | | MAXIMUM INCIDENCE ANGLE $\alpha i$ | MINIMUM INCIDENCE ANGLE $\alpha f$ | ANGLE AT INITIAL GROWTH PORTION $\theta i$ | ANGLE AT FINAL GROWTH PORTION $\theta f$ |
| EXAMPLE 1 | 50 nm | 70° | 45° | 54° | 29° |
| EXAMPLE 2 | 30 nm | 60° | 40° | 44° | 25° |
| EXAMPLE 3 | 40 nm | 90° | 65° | 70° | 50° |
| COMPARATIVE EXAMPLE 1 | 50 nm | 70° | 40° | 54° | 27° |
| COMPARATIVE EXAMPLE 2 | 50 nm | 75° | 45° | 63° | 29° |
| COMPARATIVE EXAMPLE 3 | 30 nm | 70° | 40° | 55° | 26° |
| COMPARATIVE EXAMPLE 4 | 40 nm | 90° | 45° | 70° | 28° |
| COMPARATIVE EXAMPLE 5 | 57 nm | 70° | 45° | 55° | 30° |

TABLE 2

| | $\theta i - \theta f$ | ELECTROMAGNETIC CONVERSION CHARACTERISTIC (CNR) |
|---|---|---|
| EXAMPLE 1 | 25° | — |
| EXAMPLE 2 | 19° | — |
| EXAMPLE 3 | 20° | — |
| COMPARATIVE EXAMPLE 1 | 27° | vs EXAMPLE 1 −0.5 dB |
| COMPARATIVE EXAMPLE 2 | 34° | vs EXAMPLE 1 −1.2 dB |
| COMPARATIVE EXAMPLE 3 | 29° | vs EXAMPLE 2 −0.8 dB |

TABLE 2-continued

| | θi-θf | ELECTROMAGNETIC CONVERSION CHARACTERISTIC (CNR) |
|---|---|---|
| COMPARATIVE EXAMPLE 4 | 42° | vs EXAMPLE 3 −2.5 dB |
| COMPARATIVE EXAMPLE 5 | 25° | MR HEAD SATURATES |

As is apparent from TABLE 1 and TABLE 2, the magnetic tape of each of Example 1 to Example 3 has a favorable electromagnetic conversion characteristic (CNR in this case), as compared with the magnetic tapes of Comparative Example 1 to Comparative Example 5. Incidentally, as above-mentioned, Example 1 to Example 3 meet the conditions that the magnetic tapes has a 55 nm or less thickness magnetic layer formed on the major surface of the elongated nonmagnetic support by performing a vacuum thin film forming technique, and that let θ, θi, θf designate an angle which a growth direction of magnetic fine particles in a columnar structure in a longitudinal cross-section of the magnetic layer forms with a normal to the longitudinal direction of the nonmagnetic support, an angle at an initial growth portion of the magnetic layer, and an angle at a final growth portion of the magnetic layer, respectively, and then the angles θi and θf have the following relation: $\theta i - \theta f \leq 25°$.

On the other hand, in the case of the magnetic tapes of Comparative Example 1 and Comparative Example 2 in each of which the magnetic layer 3 has a thickness equal to that of the magnetic layer 3 of Example 1, and in which the angle θi at an initial growth portion of the magnetic layer and the angle θf at the final growth portion of the magnetic layer satisfy the following relation: $\theta i - \theta f > 25°$, the electromagnetic conversion characteristic (CNR) is deteriorated, as compared with that of the sample magnetic tape of Example 1.

In the case of the magnetic tapes of Comparative Example 3 in which the magnetic layer 3 has a thickness equal to that of the magnetic layer 3 of Example 2, and in which the angle θi at an initial growth portion of the magnetic layer and the angle θf at the final growth portion of the magnetic layer satisfy the following relation: $\theta i - \theta f > 25°$, the electromagnetic conversion characteristic (CNR) is deteriorated, as compared with that of the sample magnetic tape of Example 2.

In the case of the magnetic tapes of Comparative Example 4 in which the magnetic layer 3 has a thickness equal to that of the magnetic layer 3 of Example 3, and in which the angle θi at an initial growth portion of the magnetic layer and the angle θf at the final growth portion thereof satisfy the following relation: $\theta i - \theta f > 25°$, the electromagnetic conversion characteristic (CNR) is deteriorated, as compared with that of the sample magnetic tape of Example 3.

In the case of the magnetic tapes of Comparative Example 5, an output of the MR head saturated, so that the measurement of the electromagnetic conversion characteristic could not be accurately performed.

Figure 6:
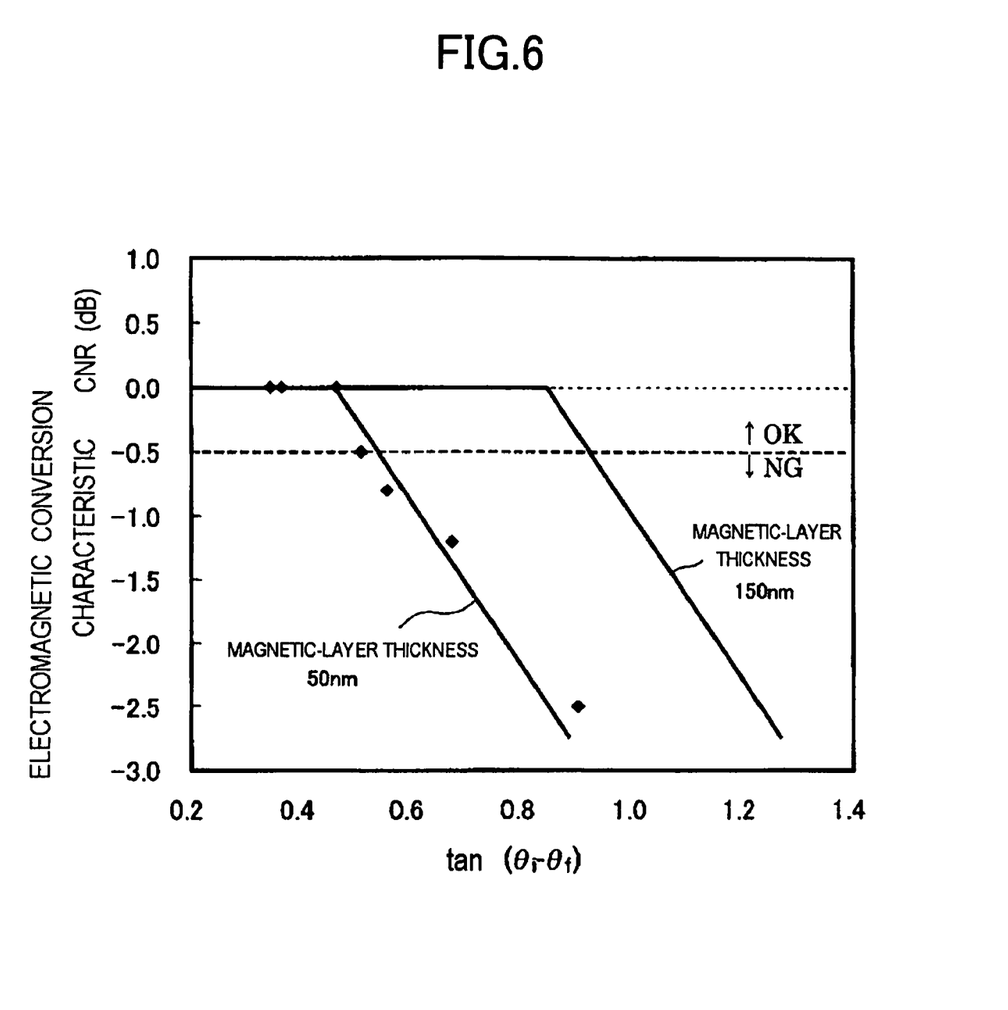
FIG. 6 is a graph illustrating the relation between a tangent of the difference of an angle θi at an initial growth portion of a magnetic layer and an angle θf in a final growth portion of the magnetic layer and a relative value of an electromagnetic conversion characteristic (that is, CNR).

Next, a magnetic tape having the magnetic layer 3, whose film thickness was 50 nm, and another magnetic tape having the magnetic layer 3, whose film thickness was 150 nm, were manufactured by the vacuum evaporator shown in FIG. 4. At that time, plural sample tapes were manufactured, among which the difference (θi−θf) between the angle θi at an initial growth portion of the magnetic layer and the angle θf at the final growth portion thereof was changed by controlling the maximum incidence angle and the minimum incidence angle. The electromagnetic conversion characteristic (CNR) of each of these sample magnetic tapes was measured. FIG. 6 shows the relation between the value of tan (θi−θf) and the relative value of the electromagnetic conversion characteristic (CNR).

FIG. 6 indicates the presence of the causal relation between the value of tan (θi−θf) and the relative value of the electromagnetic conversion characteristic (CNR). Especially, in the case of the magnetic tape of the high-density recording magnetic recording medium in which the magnetic layer has a film thickness of 50 nm, the electromagnetic conversion characteristic (CNR) noticeably changed within a range of the value of tan (θi−θf) from 0.4 to 0.6. When the limit to tolerable degradation of the electromagnetic conversion characteristic was set to −0.5 dB, the corresponding value of tan (θi−θf) was about 0.47. That is, it turns out that favorable electromagnetic conversion characteristic was obtained when the value of tan (θi−θf) was equal to or less than 0.47, thus, when the value of (θi−θf) is equal to or less than 25° in the case of the high-density recording magnetic recording medium having a magnetic layer whose film thickness was 50 nm.

Although the preferred embodiment of the present invention has been described above, it should be understood that the present invention is not limited thereto and that other modifications will be apparent to those skilled in the art without departing from the sprit of the invention. The scope of the present invention, therefore, should be determined solely by the appended claim.

What is claimed is:

1. A magnetic recording medium having a magnetic layer with a thickness of 50 nm or less formed over a surface of an elongated nonmagnetic support by a vacuum thin film forming technique, wherein an angle θ which is a growth direction of magnetic particles in a longitudinal cross-section of said magnetic layer with respect to a line normal to said nonmagnetic support, satisfies the following relation:

$\theta i - \theta f \leq 25°$ where θi is an angle of initial growth for said magnetic layer, and θf is an angle of final growth for said magnetic layer, and further wherein a deposition range is restricted such that a maximum incidence angle αi and minimum incidence angle αf satisfies the relationship:

$60° \leq \alpha i \leq 70°$ $40° \leq \alpha f \leq 45°$.

2. The magnetic recording medium according to claims 1, wherein $19° \leq \theta i - \theta f \leq 25°$.

* * * * *